United States Patent [19]

Olsson et al.

[11] 4,060,707
[45] Nov. 29, 1977

[54] BALANCING DEVICE AND METHOD FOR A ROTATING BODY

[75] Inventors: Karl Olof Olsson; Jörgen Wildheim, both of Finspong, Sweden

[73] Assignee: Stal-Laval Turbin AB, Vasteras, Sweden

[21] Appl. No.: 663,588

[22] Filed: Mar. 3, 1976

[30] Foreign Application Priority Data

Mar. 6, 1975 Sweden .................................. 7502480

[51] Int. Cl.² ............................................. B23K 27/00
[52] U.S. Cl. ............................ 219/121 LM; 73/461; 73/66; 73/462; 432/10; 72/80
[58] Field of Search ................ 72/80; 164/287; 73/66, 73/461, 468; 74/572–573; 219/121 L, 121 LM; 432/1; 148/1, 4

[56] References Cited

U.S. PATENT DOCUMENTS

| 3,499,136 | 3/1970 | Nunnikhoven et al. ...... 219/121 LM |
| 3,621,180 | 11/1971 | Rolff .............................. 219/121 L |
| 3,755,646 | 8/1973 | Muller .......................... 219/121 LM |

FOREIGN PATENT DOCUMENTS

| 458,554 | 3/1928 | Germany .............................. 73/461 |

Primary Examiner—J. V. Truhe
Assistant Examiner—Mark Paschall
Attorney, Agent, or Firm—Pollock, Vande Sande & Priddy

[57] ABSTRACT

A balancing device and method for balancing a rotating body during operation. The device and method detects the phase and amount of unbalance and provides signals in synchronism with the unbalance. Local heating of the rotating body is provided to counteract the unbalance by thermal deformation of the axis of the body without removing material. The phase and amount of the local heating are controlled in relation to unbalance detected.

9 Claims, 4 Drawing Figures

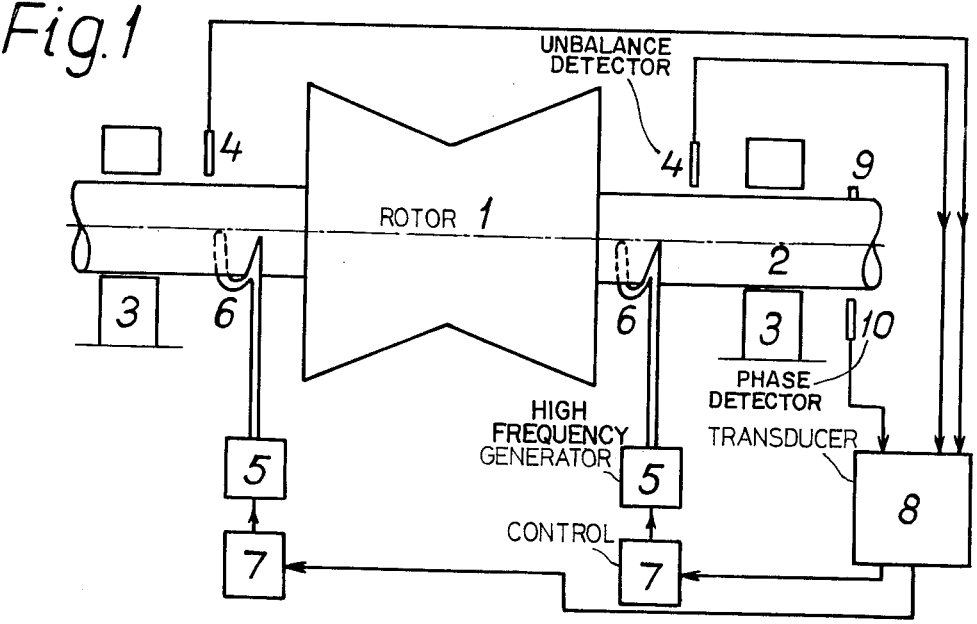
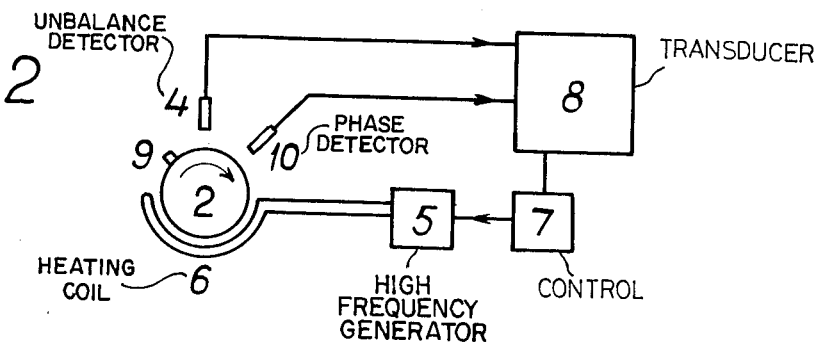
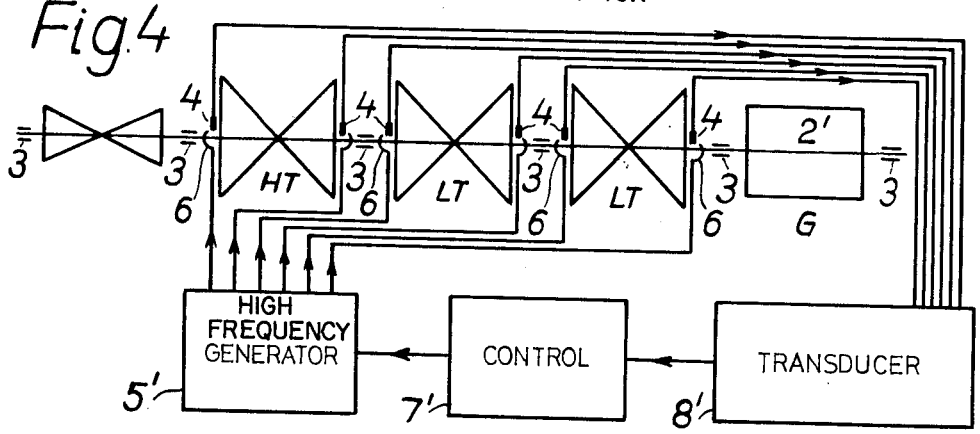

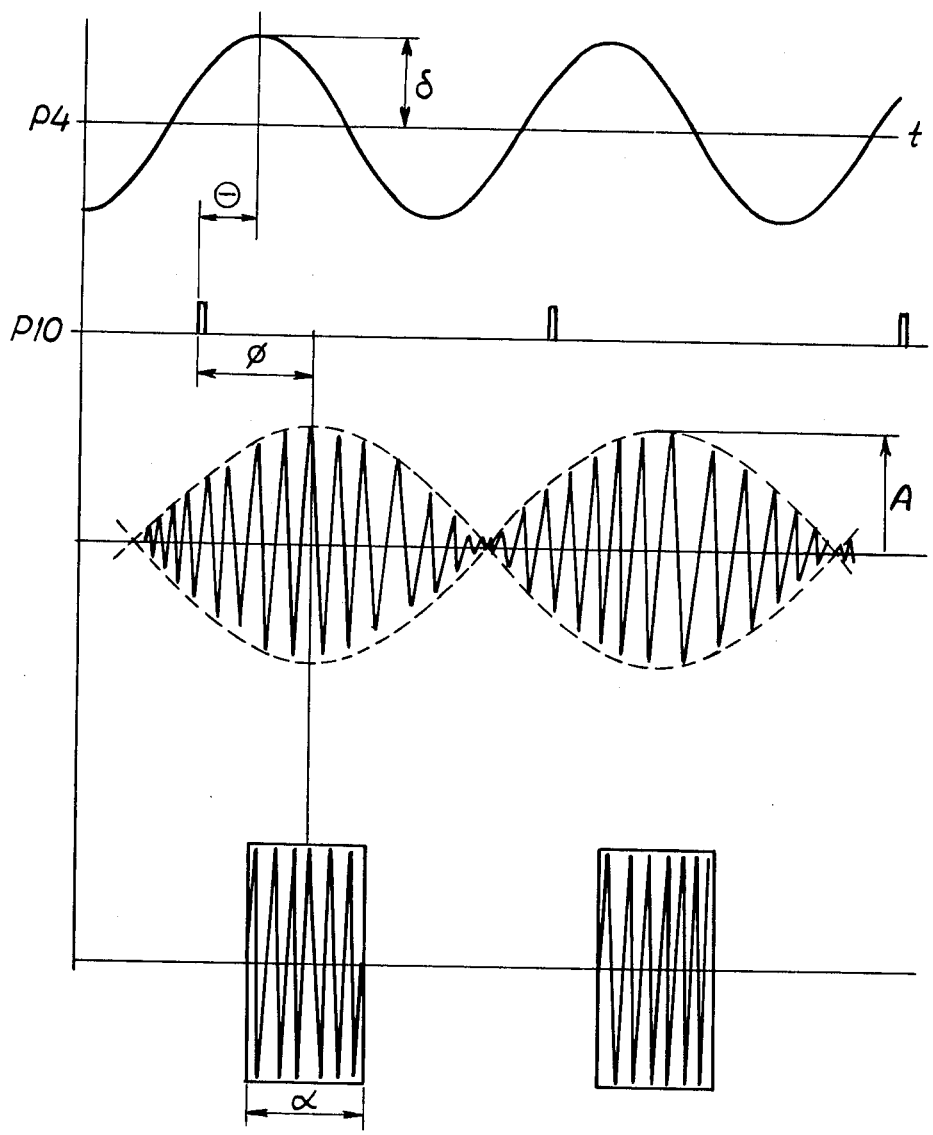

BALANCING DEVICE AND METHOD FOR A ROTATING BODY

FIELD OF THE INVENTION

The present invention relates to a device for balancing a rotating body during rotation.

BACKGROUND

As an example of such a body there may be mentioned, above all, the rotors of large machines, for example turbo-machines or electric machines. Such rotors are usually balanced first of all in the manufacture and thereafter in connection with the erection at the place where the machine is to be used, and then in both cases normally by means of weight balancing, correction balances being placed at appropriate places. This procedure is time-consuming and expensive and does not always lead to a satisfactory result in the case of machines with great susceptibility to unbalance. This is true in particular if the unbalance is due in a minor degree on a real mass unbalance, but more to a deformation of the rotor, in which case weight balancing often does not give good results. In addition, the rotor may change with time, and also the pressure on the rotor may cause a change in balance.

The art also evidences devices to selectively cut away small portions of the rotating body so as to counteract unbalance. See U.S. Pat. No. 3,499,136 and corresponding thereto U.K. Pat. No. 1,178,337.

To be able to satisfy high demands on the balance of a rotary machine it would therefore be desirable to be able to perform an after-balancing of the rotor during operation, and according to the invention a device for this purpose is proposed according to the appending claims.

SUMMARY OF THE INVENTION

The invention is based on an unsymmetrical, local heating of the rotor, which is to be bent as a result of the heating so that the unbalance is counteracted. More particularly, the phase and magnitude of any unbalance is detected and an energy source supplies energy pulses to the rotating body for local asymmetric heating to cause thermal deformation of the axis of the body without removing or adding material from or to the body.

BRIEF DESCRIPTION OF THE DRAWINGS

The invention will be described in more detail with reference to the accompanying drawings, in which FIG. 1 shows a machine with a device according to the invention, FIG. 2 showing a detail of FIG. 1, FIG. 3 shows a diagram of the vibration of the rotor and the energy pulses fed to the rotor, and FIG. 4 shows the device according to the invention applied to a more complicated machine plant.

DETAILED DESCRIPTION

FIG. 1 shows a rotary machine with rotor 1, a shaft 2 and bearings 3, the stator of the machine being omitted for the sake of simplicity. For indication of a possible unbalance in the rotor in operation there are arranged sensing members 4 which, as shown, may be inductive or electro-magnetic transducers sensing the variation in the distance between the shaft 2 and the members 4, as indicated in FIG. 3.

Instead of electro-magnetic transducers it is possible to use capacitive transducers or optical transducers which may operate, for example, according to the echo method by means of light pulses reflected from the surface of the shaft. Instead of sensing the deflection of the shaft it would be possible to build in pressure-sensitive transducers in the bearings 3 or in connection with the oil film of the bearings. There are different types of such transducers to choose from depending on what signal processing is preferred. The essential point is that transducers are used which are able to emit distinct signals in clear synchronism with the rotor and with a magnitude which reflects the degree of the unbalance.

In order to compensate for the unbalance, according to the invention, the rotor is asymmetrically heated at appropriate places while in operation, which thus means that the rotor is to be supplied with energy pulses synchronously with the rotation so that the asymmetric heating causes a deformation which counteracts the unbalance. To achieve such an asymmetric heating it is necessary to have an energy source capable of conveying distinct pulses with a sufficiently high energy and with a short duration synchronously with the rotation of the rotor.

As such an energy source there may be used a high-frequency generator 5 which is controlled by a control device 7 and feeds energy pulses through a coil 6 to pre-selected places on the shaft 2. The location and construction of the high-frequency coils 6 depend partly on how the shaft and the rotor may be expected to become deformed at the operating speed, partly on where it will be possible to place the coils, and also on how the rotor or the shaft can be affected by the heat influence. This, in turn, may depend on whether the rotor or the shaft is ferromagnetic, electrically conducting or electrically insulating. The drawings, which show the coils 6 adjacent shaft 2 are intended to generally depict heating of the rotating body. Thus the invention contemplates heating either the rotor 1, shaft 2, or both.

FIG. 2 shows in axial section how the member 4 and the coil 6 can be located in relation to the shaft 2. FIGS. 1 and 2 further indicate an angle reference system 9, 10, comprising a marking point 9, for example a boss on, or a hole in, the shaft 2 and a sensing member 10 which may be of the same type as the member 4. The signals from the members 4 and 10 are supplied to a signal transducer 8 for the control device 7, the energy pulses thus being supplied to the coil 6 with a correct phase position in relation to rotation of the rotor.

Thus the transducer 8 may well include a transducer per se to convert the output of members 4 and 10 to suitable electrical signals, a pulse shaper and a delay circuit as shown, for example in U.K. Pat. No. 1,178,337. The delay may be manually adjustable, as shown in the referenced patent. In addition, a divider may optionally be included, as mentioned below. The control device 7 can be implemented in the form of a switch to start or stop the generator 5 at appropriate times, or to control the phase and amplitude of the output of generator 5 both as shown in FIG. 3.

To attain the asymmetric heating, the energy pulses are controlled in time with the rotation of the rotor. This can be done either by amplitude modulation or by pulse modulation, which are both shown in FIG. 3. The first line in FIG. 3 indicates the signal $p4$ from the member 4, i.e., the variation of the unbalance. The second line indicates the pulses $p10$ from the member 10, the phase position $\theta$ of the amplitude of the unbalance thus being defined. Through the angle $\theta$ and the angle between the member 4 and the coil 6, the desired phase position $\phi$ of the energy pulses can be determined. Often it may be desirable to make a manual adjustment of $\phi$ within a precalculated range in order to achieve an exact balance. The degree of asymmetrical supply of heat is then determined by the amplitude A of the modulation or the duration $\alpha$ of the pulse, respectively, as indicated in lines 3 and 4 of FIG. 3. The values of A and $\alpha$ as well as $\phi$ are controlled by means of the control device 7. A, $\alpha$, and $\phi$ are selected based on the amplitude $\delta$ and phase angle $\theta$ of the vibrations. How the relations between A, $\alpha$ and $\delta$ and $\phi$ and $\theta$ are to be chosen may in exceptional cases be determined by a theoretical analysis, but must in general be determined by tests.

Generally the heating should be applied to an area centered 180° out of phase with the unbalance. However, to determine $\phi$ it is also necessary to take into account the time constants of the circuits and the thermal transmission characteristics of the heating system.

If, during heating, $\theta$ changes, the phase angle $\phi$ should be altered in the opposite sense, by an equal amount. If, on the other hand, $\theta$ does not change, then $\phi$ should also remain constant, if $\delta$ is reduced by the application of heat. If $\delta$ grows then $\phi$ must be changed 180°. In either event $\alpha$ or A should be maintained or increased until $\delta$ is reduced to zero.

Where the control pulses take the form shown in the fourth line of FIG. 3, the frequency of the pulses may be the same as that of the signal pulses, i.e., $p4$ or a sub-multiple thereof. In the latter instance, heat would only be applied 1 out of $n$ revolutions where the frequency of the control pulses was $1/n$ the frequency of the signal pulses. This can be implemented by using a $1/n$ divider in the control device 7.

Instead of a high-frequency generator as the energy source, it would be possible to have any energy source which is able to supply controlled, energy-rich pulses with the desired frequency and phase position. As a very simple energy source, particularly at lower speeds of rotation, it would be possible to use a welding torch controlled by a rotating or oscillating diaphragm. As one further extremity a laser beam might be used, which is able to fulfill the highest demands both with regard to energy and controllability.

In principle, the phase position of the energy pulses over the coils 6 could be determined directly in relation to the signals from the members 4, in which case the reference system 9, 10 could be omitted. However, the purpose of the arrangement according to the invention is to balance out the vibrations completely so that the signals from members 4 fall away. Then in order to maintain the balance, the phase position and magnitude of the energy pulses must be secured by providing the transducer 8 with some kind of memory device which records the original phase position $\theta$ of the signals from member 4 in relation to the reference system 9, 10. For this reason, and possibly also to be able to point out the phase position of the unbalance after stopping, the reference system 9, 10 is desirable. In FIGS. 1 and 2 there are indicated connections for transmitting signals from transducer 8 to control device 7. It is within the scope of the invention to employ manually made connections between transducer 8 and control device 7 so that, for example, balancing in the proper sense is assured when a newly installed plant is started up for the first time.

FIG. 4 shows as an example a more complicated machine plant comprising the connected rotors for a high-pressure turbine HT, a number of low-pressure turbines LT and a generator G. In such a case there are a great number of bearings 3, and therefore the unbalance must be measured by members 4 in so many places as are required to have a desirable survey of any unbalance. Furthermore, heating coils 6 or similar energy pulse devices must be located at such places where a local heating may provide a desired compensation for the unbalance. To achieve a correct signal processing, the signal transducer 8' in such a case should be constructed as a programmed arithmetic unit of a minicomputer type or the like, so that the control device 7' is able to achieve proper distribution of the energy pulses from the high-frequency generator 5'.

We claim:

1. A balancing device for balancing a rotating body having an axis while in operation by asymmetrical thermal deformation comprising
   a. means for sensing the phase and magnitude of unbalance in said rotating body,
   b. transducing means, connected to said sensing means, for providing a signal representative of the phase and magnitude of said unbalance,
   c. an energy source for supplying energy pulses to said rotating body for local asymmetric heating to case thermal deformation of the axis of the body without removing or adding any material from or to the body,
   d. control means, responsive to said transducing means, for controlling said energy source to control the phase and amount of said energy pulses, supplied to said rotating body, and
   said control means controlling said energy source to supply energy pulses to said rotating body at a position opposite said unbalance.

2. The device of claim 1 wherein said control means operates to supply energy pulses to said rotating body with a frequency equal to the rotation of said rotating body.

3. The device of claim 1 wherein said control means operates to supply energy pulses to said rotating body with a frequency which is a sub-multiple of the rotation of said rotating body.

4. The device of claim 1 wherein said transducing means provides a signal representative of the magnitude of said unbalance as well as the phase thereof, and said control means controls the amplitude as well as the phase of the energy pulses supplied to said rotating body.

5. The device of claim 1 which further includes a phase reference system including a fixed marking means on said rotating body and a sensing device for determining the phase angle of said unbalance.

6. A method for balancing a rotating body while in operation by local asymmetric heating and thus thermal deformation of its axis, comprising the steps of:
   a. detecting phase and amount of an unbalance in said body,
   b. converting said detected unbalance into a phase and amount responsive signal, and
   c. asymmetrically heating predetermined parts of said rotating body in dependence on said signal, by local application of energy pulses without removing material from said body.

7. The method of claim 6 in which said step (c) includes applying energy on each rotation of said body.

8. The method of claim 6 in which said step (c) includes applying energy on each $1/n$ rotation of said body, where $n$ is a positive integer.

9. The method of claim 6 wherein said step (c) heats said rotating body at a position opposite said unbalance.

* * * * *